(12) United States Patent
Kaluzhny

(10) Patent No.: US 12,105,991 B2
(45) Date of Patent: Oct. 1, 2024

(54) MAPPING FOR STORING DATA AND METADATA

(71) Applicant: WINBOND ELECTRONICS CORPORATION, Taichung (TW)

(72) Inventor: Uri Kaluzhny, Beit Shemesh (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 68 days.

(21) Appl. No.: 18/081,723

(22) Filed: Dec. 15, 2022

(65) Prior Publication Data

US 2024/0201897 A1 Jun. 20, 2024

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0679* (2013.01)

(58) Field of Classification Search
None
See application file for complete search history.

(56) References Cited

U.S. PATENT DOCUMENTS

| 11,294,902 | B2 | 4/2022 | Kondiles et al. | |
|---|---|---|---|---|
| 2003/0204699 | A1* | 10/2003 | Talagala | G06F 11/1004 |
| | | | | 711/202 |
| 2019/0220416 | A1* | 7/2019 | Jung | G06F 12/1009 |

OTHER PUBLICATIONS

Jones, "Reciprocal Multiplication, a tutorial," Part of the Arithmetic Tutorial Collection by Douglas W. Jones, The University of Iowa, Department of Computer Science, pp. 1-15, year 1999.
Jones, "Modulus without Division, a tutorial," Part of the Arithmetic Tutorial Collection by Douglas W. Jones, The University of Iowa, Department of Computer Science, pp. 1-9, year 2001.

* cited by examiner

*Primary Examiner* — Daniel D Tsui
(74) *Attorney, Agent, or Firm* — MEITAR PATENTS LTD.

(57) ABSTRACT

A memory device includes a Non-Volatile Memory (NVM) comprising a plurality of sectors, and a memory access circuit. The memory access circuit is configured to receive, from a host, a logical address of a block of data, to compute a mapping of the logical address to a data physical address comprising a selected sector among the plurality of sectors and a selected data offset within the same selected sector, to compute a metadata physical address that comprises the selected sector and a metadata offset in the selected sector, and to access the block of data at the data physical address, and the metadata at the metadata physical address.

16 Claims, 5 Drawing Sheets

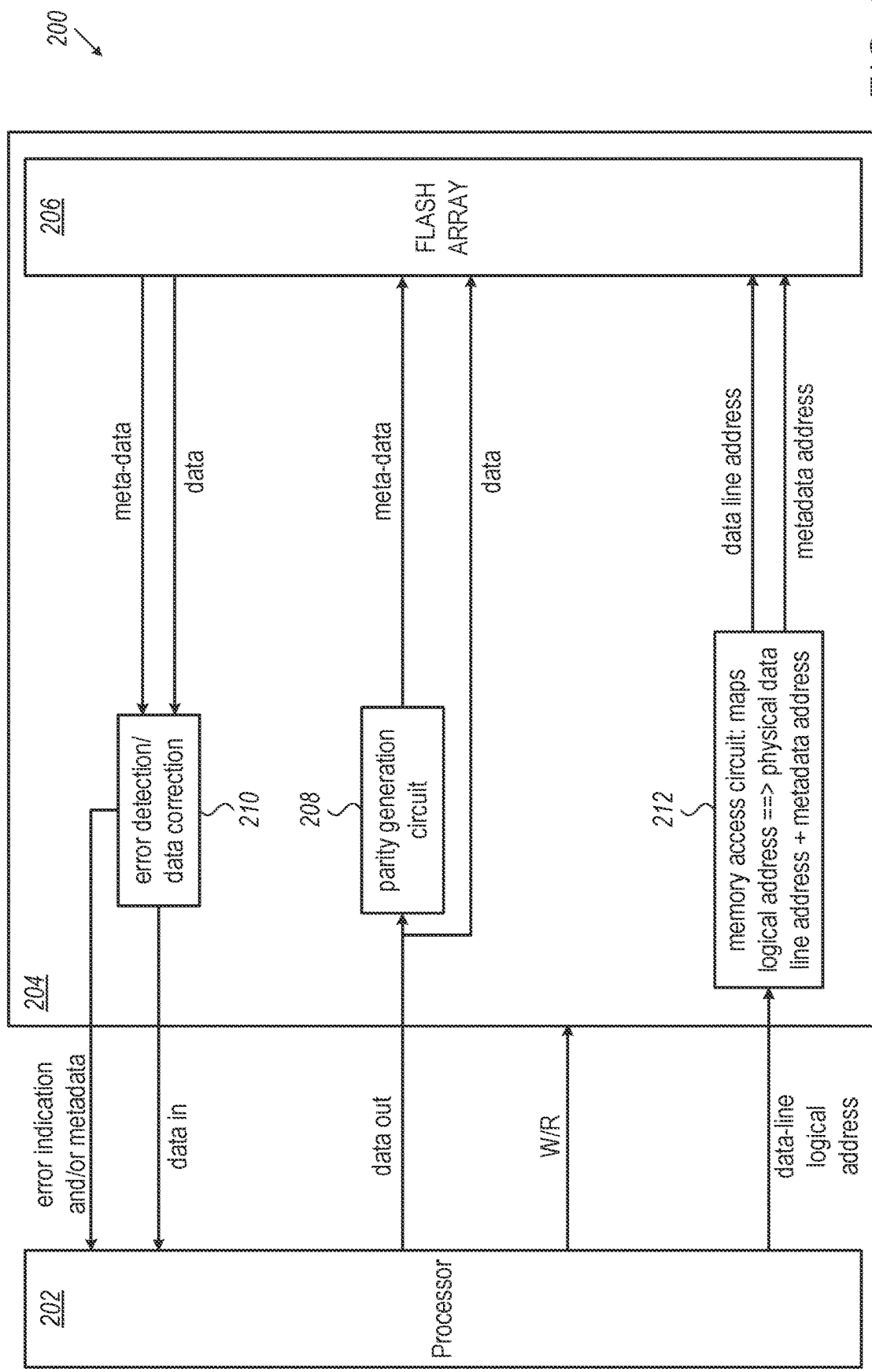

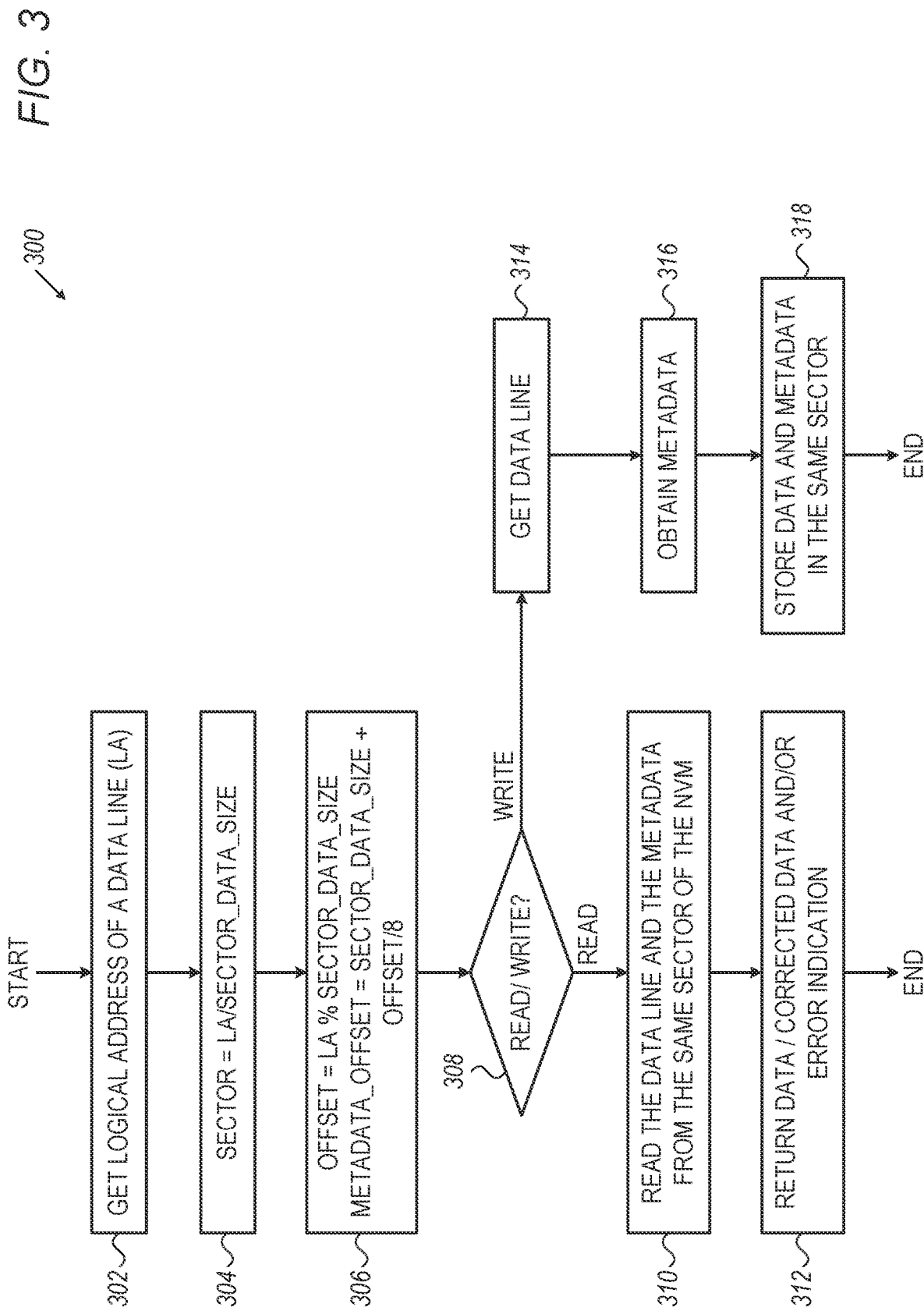

MAPPING FOR STORING DATA AND METADATA

FIELD OF THE INVENTION

The present invention relates generally to non-volatile memories, and particularly to methods and systems for efficient storage of data and metadata in non-volatile memories.

BACKGROUND OF THE INVENTION

Non-volatile memories, and in particular flash memories, often store data and corresponding metadata in storage units referred to as sectors.

U.S. Patent Application Publication 2003/0204699 describes a method for embedding integrity metadata. In one exemplary embodiment, a plurality of integrity metadata segments is determined. Each integrity metadata segment is associated with a segment of user data. The user data is mapped to a plurality of physical sectors, each physical sector containing a segment of user data and the associated integrity metadata segment. For one exemplary embodiment, a common I/O data block size is determined, and its data is mapped into a number of 512-byte sectors. The number of. 512-byte sectors corresponds to the number required for the common I/O data block size plus one or more additional 512-byte sectors. This creates additional space in each sector to accommodate the integrity metadata. The integrity metadata for each sector is mapped to the additional space of each sector.

U.S. Pat. No. 11,294,902 describes a method that includes generating, by a processing entity of a computing system, a plurality of parity blocks from a plurality of lines of data blocks. A first number of parity blocks of the plurality of parity blocks is generated from a first line of data blocks of the plurality of lines of data blocks. The method further includes storing, by the processing entity, the plurality of lines of data blocks in data sections of memory of a cluster of computing devices of the computing system in accordance with a read/write balancing pattern and a restricted file system.

SUMMARY OF THE INVENTION

An embodiment that is described herein provides a memory device including (i) a Non-Volatile Memory (NVM) including a plurality of sectors, and (ii) a memory access circuit. The memory access circuit is configured to receive, from a host, a logical address of a block of data, to compute a mapping of the logical address to a data physical address comprising a selected sector among the plurality of sectors and a selected data offset within the same selected sector, to compute a metadata physical address that comprises the selected sector and a metadata offset in the selected sector, and to access the block of data at the data physical address, and the metadata at the metadata physical address.

In an embodiment, the memory access circuit is configured to receive a write command and the block of data from the host, and, responsively, obtain the metadata that corresponds to the block of data, store the block of data in the NVM at the data physical address, and store the metadata in the NVM at the metadata physical address. In another embodiment, the memory access circuit is configured to receive a read command from the processor and, responsively, read the block of data that is stored in the NVM at the data physical address, and read the metadata that is stored in the NVM at the metadata physical address.

In some embodiments, a size of each sector, in bytes, is an integer power of two, and a number of blocks of data in each sector is of the form $(2^m-1) \cdot 2^n$, m and n denoting integer values.

In a disclosed embodiment, the memory access circuit includes a divide-by-$(2^m-1)$ circuit, which is designed to compute an integer division of a given input by $(2^m-1)$, and the memory access circuit is configured to compute the mapping of the logical address to the data physical address by applying the divide-by-$(2^m-1)$ circuit to the logical address. In an example embodiment, the divide-by-$(2^m-1)$ circuit is configured to compute the integer division of the given input by $(2^m-1)$ by: calculating a shift-and-add sum of (i) the given input and (ii) the given input shifted left by integer multiples of m bits; repeating calculation of the shift-and-add sum a number of times d, depending on a required precision; cutting off (d−1) m least significant bits of the sum to obtain a result, and adding $2^m$ to the result if the result is equal to $2^m-1$; and cutting off the m least significant bits.

In a disclosed embodiment, the memory access circuit includes a modulo-$(2^m-1)$ circuit, which is designed to compute a modulo-$(2^m-1)$ of a given input, and the memory access circuit is configured to compute the data offset and the metadata offset by applying the modulo-$(2^m-1)$ circuit to the logical address. In an example embodiment, the modulo-$(2^m-1)$ circuit is configured to receive an input number and, recursively: (i) divide the input number into a group of m-bit fragments, (ii) add the m-bit fragments to one another to obtain an output number smaller than the input number; and (iii) repeat steps (i) and (ii) until the output number is less than $2^m$. In an example embodiment, m equals 3.

There is additionally provided, in accordance with an embodiment that is described herein, a method for accessing a Non-Volatile Memory (NVM) that includes a plurality of sectors. The method includes receiving, from a host, a logical address of a block of data. A mapping of the logical address to a data physical address is computed. The data physical address includes a selected sector among the plurality of sectors and a selected data offset within the same selected sector. A metadata physical address, which includes the selected sector and a metadata offset in the selected sector, is computed. The block of data is accessed at the data physical address, and the metadata is accessed at the metadata physical address.

The present invention will be more fully understood from the following detailed description of the embodiments thereof, taken together with the drawings in which:

BRIEF DESCRIPTION OF THE DRAWINGS

FIG. 2 is a block diagram that schematically illustrates a computer system that comprises a non-volatile memory (NVM), in accordance with an embodiment of the present invention;

FIG. 3 is a flowchart that schematically illustrates a method for storing and retrieving data in an NVM, in accordance with an embodiment of the present invention;

DETAILED DESCRIPTION OF EMBODIMENTS

Overview

Figure 1:
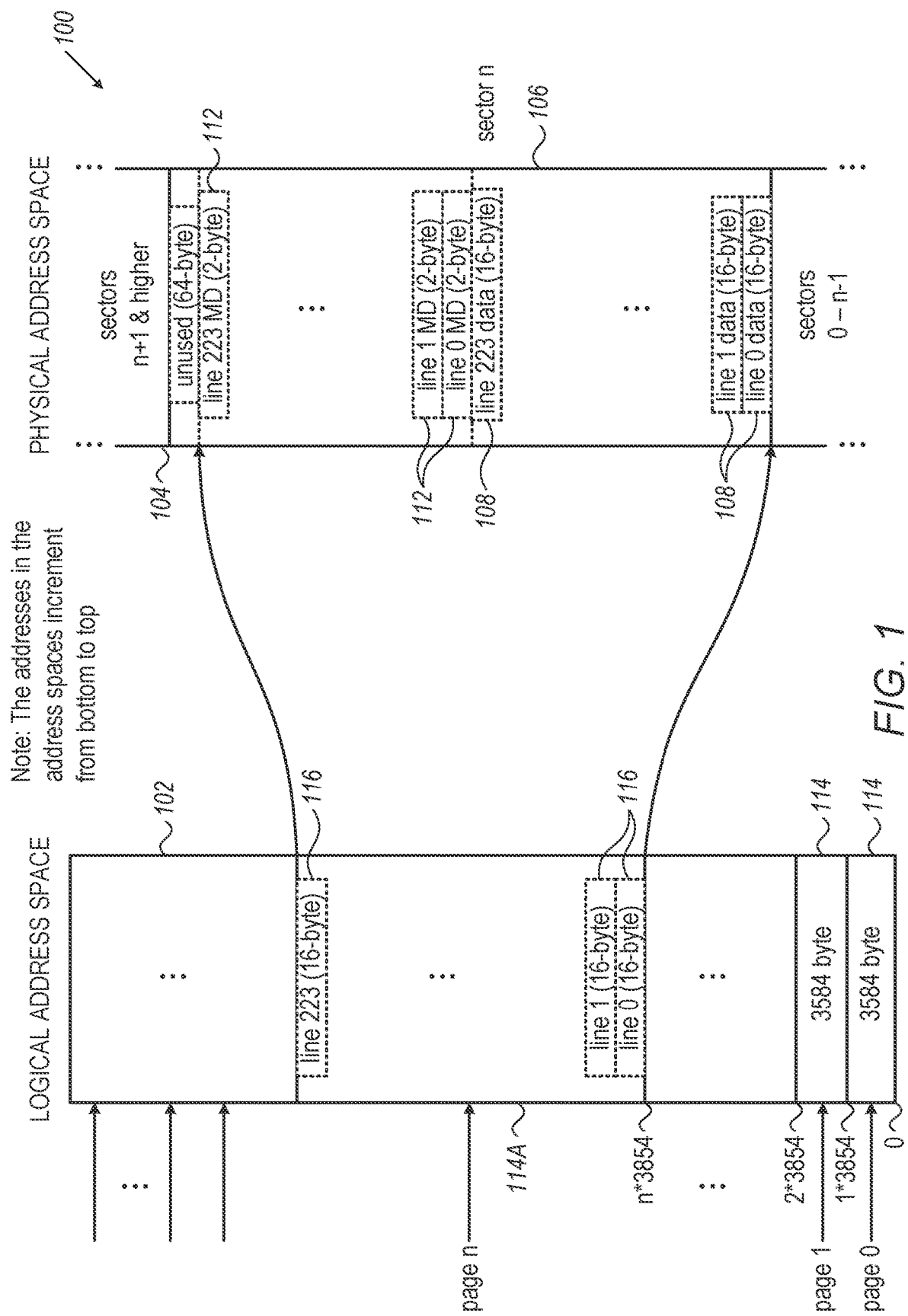
FIG. 1 is a block diagram that schematically illustrates an address mapping between a logical address space and a physical address space, in accordance with an embodiment of the present invention.

NVM devices often store metadata that corresponds to stored blocks of data (the blocks of data are referred to herein as "data lines"). For example, a parity signature, such as Cyclic Redundancy Code (CRC) or Error Correcting Code (ECC) or others is often used to enhance the reliability of the read data. An NVM such as a flash memory comprises sectors, wherein a sector is the smallest unit of storage that can be individually erased.

One possible implementation is to store data lines and the corresponding metadata in separate sectors—this allows direct mapping of the user's logical address space to a physical address space that defines addresses in the NVM. For example, assuming 4K-byte sectors, a 24-bit logical address can be mapped to a sector number and an offset within the sector, wherein the sector number comprises the most-significant twelve bits and the offset comprises the least significant twelve bits of the logical address.

However, storing the data and metadata in separate sectors means that data erasure will involve erasing the metadata in the sector (in which it occupies only a small fraction). Since in flash there is no way to erase a part of a sector, no other data can be stored in this sector and much of the physical space is lost.

Embodiments of the present invention that are disclosed herein provide circuits and methods wherein data lines and corresponding metadata are stored in the same sector. In embodiments, an NVM memory device comprises a memory access circuit (MAC) that facilitates efficient logical to physical address mapping.

In embodiments, the logical address space is divided into logical pages (groups of the data lines and the corresponding metadata). The size of each page is close to the size of the physical sector and the number of the data lines in the page is (2m−1)*2n, where n an m are integers.

In one example embodiment, the logical address space is divided into logical pages, each page comprising 224=7*32 16-byte data lines. Each logical page is located in a 4096-byte physical sector and the data lines are stored in consecutive addresses in the sector. A two-byte metadata is calculated separately for each 16-byte data line. All metadata are stored right after the last data line (starting at offset 224*16=3, 584 from the beginning of the sector). The data and the metadata together occupy 224*(16+2)=4032 bytes, leaving only 64 unused bytes in each sector.

In some embodiments, a computer system may comprise a processor, an NVM memory device, and a random-access-memory (RAM) that is shared by the processor and the memory device. The memory device comprises a memory access circuit (MAC). To store data in the NVM, assuming the data is initially in the shared RAM, the processor sends the logical address of the data to the MAC. The MAC calculates the beginning of the data-line that includes the logical address and then reads the complete data line from the shared memory. The MAC then obtains a metadata that corresponds to the data line (e.g., using a parity generation circuit, or by requesting o calculate the metadata), calculates the physical address of the data and the metadata, and stores the data and the metadata in the same sector in the NVM.

To read data from the NVM, the processor sends the logical address of the data to the MAC. The MAC calculates the corresponding physical addresses of the data and metadata, and then reads the data and the metadata. The processor may correct the data (for example, if the metadata is an ECC code of the data line), store the data in the shared RAM and, if needed, indicate an error.

In embodiments, the number of data lines in a logical page is of form $(2^m-1)*2^n$. The MAC comprises a divide-by-$(2^m-1)$ circuit that divides an input number by $2^m-1$.

In other embodiments, the MAC comprises a modulo-$(2^m-1)$ circuit that calculates the modulo-$(2^m-1)$ division of a number.

In an example embodiment, m=3, the number of data lines in a logical page is 224=7*25, and address mapping includes integer divide-by-7 and modulo-7 calculations.

Efficient Integer Division by $2^M-1$

Mathematically, division by $2^m-1$ is equal to:

$$\frac{X}{2^m-1} = \sum_{n=1}^{\infty} X*2^{-mn}$$

In practice, the infinite sum is cut to the required number of terms according to the needed precision. Let's call this number d. Then:

$$\frac{X}{2^m-1} \approx \sum_{n=1}^{d} X*2^{-mn} = \frac{1}{2^{dm}} \sum_{n=0}^{d-1} X*2^{mn}$$

From this formula, one sees that $$\frac{X}{2^M-1}$$

can be calculated as follows:

1. Add to the given input and the given input shifted left by integer multiples of m bits;
2. Repeat the shift-and-add a number of times d, depending on a required precision;
3. Cut off d·m least significant bits of the sum to obtain a result.

To deal with the calculation error resulting from casting the rest of the terms in the infinite sum, the last step shall be performed in two stages:

3a. Cut off (d−1)·m least significant bits of the sum to obtain a result and add $2^m$ to the result if the result is equal to $2^m-1$, and 3b. Cut off the m least significant bits.

A formal definition of the division is provided below in the form of a Python program. The parameter depth defines the number of terms in the internal sum.

```
def div_by_add(x, m, depth=5):
    M = (1 << m) - 1
    res = sum(x << (m * i) for i in range(depth))
    res >>= (m * (depth - 1))
    if res & M == M:
        res == 1 << m
    return res >> m
```

The depth of the above sum determines the range in which the algorithm gives the correct answer. This parameter shall be chosen according to the requirements by running a simulation. Some results of the numeric simulations are provided in the table below:

| | |
|---|---|
| div by 7 | depth = 3 works until x = 455 |
| | depth = 4 works until x = 3591 |
| | depth = 5 works until x = 28679 |
| | depth = 6 works until x = 229383 |
| div by 15 | depth = 3 works until x = 3855 |
| | depth = 4 works until x = 61455 |
| | depth = 5 works until x = 983055 |
| | depth = 6 works for more than x = 1000000 |
| div by 31 | depth = 3 works until x = 31775 |
| | depth = 4 works for more than x = 1000000 |

System Description

NVM devices such as Flash memories often store data in sectors, wherein a sector is the smallest entity that can be independently erased. In embodiments, for easier data management, user data and the corresponding metadata are stored in the same sector. In an embodiment, the user refers to data in terms of logical pages of a logical address space, obliviously to where the data is stored; the logical address is converted to a suitable sector in the flash memory, to an offset within the sector to where the data is stored, and to an offset within the sector to where the corresponding metadata is stored. The address in the flash, including sector number and offset, is referred to as the physical address. The process of converting a logical address to a physical address will be referred to as address mapping.

FIG. 1 is a block diagram that schematically illustrates an address mapping 100 between a logical address space 102 and a physical address space 104, in accordance with an embodiment of the present invention.

According to the example embodiment illustrated in FIG. 1, the physical address space comprises 4096-byte sectors 106; each sector comprising 224 16-byte data lines 108, and, for each data line, a respective two-byte metadata 110 (64 bytes of the sector are not used).

Since there are 224 data lines in one physical sector, each line is 16 bytes, there are 3584 bytes of data in a physical sector. The logical address space is contiguous and is mapped into the physical sectors so that the first byte of each 3584-byte page is mapped to the first byte of the corresponding physical sector, so that the logical address n*3584 is mapped to first byte of the n-th physical sector.

It should be noted that, while this direct mapping is convenient, the present invention is not limited to direct mapping, and any other one-to-one mapping may be used in alternative embodiments; for example, in embodiments, logical page to physical page mapping may be done according to a table, which is maintained by a wear-leveling flash management software. In other embodiments, data line mapping within the page is scrambled, for better security.

The configuration of logical to physical address mapping 100 illustrated in FIG. 1 and described hereinabove is an example that is cited by way of example. Other mapping configurations may be used in alternative embodiments. For example, in an embodiment, the sector size may be 8192 bytes, or any other suitable size. In some embodiments, the number of metadata bytes associated with each data-line may be more than two (e.g., four) or, in an embodiment, one.

In another embodiment, the size and/or the number of data lines in each page may be different from 16. In yet another embodiment, metadata for each data-line is stored directly following the data-line.

The unused space in each sector described above may be used, in some embodiments, for further metadata and/or any other suitable use; in an embodiment, the space may store an erase-counter, for wear leveling.

Address Mapping

We assume below that the logical and the physical address spaces are uniform spaces, starting at address 0. When this is not the case, e.g., when a physical page is mapped to an arbitrary sector, a page-number mapping table may be added.

In an example embodiment, to be described below, we designate the following constants:
1. sector_size=4,096 bytes (256 16-byte lines).
2. 16-byte data lines, each comprising two metadata bytes.
3. n_data_lines=224 (number of data lines in a sector that are used for data storage).
4. sector_data_size (storage bytes in a sector)=16*n_data_lines=3,584.

The logical to physical address mapping, which receives the logic address (LA) of a data line and outputs the physical addresses of the data and of the corresponding metadata is defined as follows:
1. sector=LA/sector_data_size (integer division)
2. data offset=LA & sector_data_size
3. sector_addr=sector*sector_size
4. metadata_offset=sector_data_size+data offset/8 (8 is the ratio between data and the corresponding metadata sizes).

FIG. 2 is a block diagram that schematically illustrates a computer system 200 that comprises a non-volatile memory (NVM), in accordance with an embodiment of the present invention.

In embodiments, computer system 200 may comprise a plurality of inter-connected Integrated Circuits (ICs) and discrete devices; in other embodiments the computer system may be a single IC (e.g., System on Silicon—SoC).

Computer system 200 comprises one or more processors 202, and at least one memory device 204. The memory device includes a Non-Volatile Memory (NVM) (e.g., a Flash memory) 206, with suitable read, program, and erase circuits (that are not shown). The NVM comprises a plurality of sectors, to store data lines (each data lines comprising, for example, 16 bytes), and, for each data line, a corresponding metadata (e.g., two bytes).

In embodiments, the metadata comprises a parity signature of the corresponding data line, such as a CRC or an ECC; other types of metadata may be stored in alternative embodiments. According the to example embodiment illustrated in FIG. 2, memory device 204 comprises a parity generation circuit 208 that is configured to generate a parity signature (e.g., CRC or ECC) of an input data line, and an Error-Detection/Correction circuit 210, which is configured to check and confirm the parity signature of an input data line, correct (for an error-correction metadata) the data line and indicate errors (if any).

Memory device 204 further comprises a memory access control circuit (MAC) 212, which is configured to control NVM accesses, including mapping logical address inputs of logical data lines (that the processor sends) to corresponding physical addresses of the data line, and including generating the physical addresses of the metadata corresponding to the data lines.

When the processor requests to store a data line at location LA, the MAC calculates a sector number for storing the data line and the corresponding metadata, calculates the offsets of the data line and the metadata, generates the metadata (in parity generation circuit 208), and then stores the data line and the metadata at the calculated offsets, in the same sector.

For a Read operation, the MAC calculates a sector number for reading the data line and the corresponding metadata, calculates the offsets of the data line and the sector and reads the data line and the metadata from the NVM. The error detection/correction circuit then checks and/or corrects the read data line and sends the corrected data line to the processor (or sends the data line and, in case an error is detected, an error indication).

The configuration of computer system 200, illustrated in FIG. 2 and described hereinabove is an example configuration that is cited merely for the sake of conceptual clarity. Other configurations may be used in alternative embodiments. For example, in some embodiments, the MAC or parts thereof is in the processor. In other embodiments, a single parity calculation circuit may be used for both generation parity and error detection/correction, replacing both parity generation circuit 208 and error detection/correction circuit 210.

FIG. 3 is a flowchart 300 that schematically illustrates a method for storing and retrieving a data line in an NVM, in accordance with an embodiment of the present invention. The flowchart is executed by MAC 212 (FIG. 2), responsively to commands and data that the memory device receives from processor 202. The flowchart starts at a Get-Logical-Address operation 302, wherein the MAC receives the logical address of a data line from the processor. Next, at a Locate Sector operation 304, the MAC integer-divides the logical address by the number of data bytes in a sector, to find a sector number ("SECTOR") (assuming that all sectors are numbered, starting from 0).

The MAC then enters a calculate-offsets operation 306, wherein the MAC calculates the data line offset within the sector by modulo-dividing LA by the sector data size, and calculates the metadata offset by adding the data line offset divided by 16 to where the metadata starts in the sector (at the data-sector-size).

At a check read-write operation 308, the flowchart splits—for a Read operation, the MAC enters a read-data-and-metadata operation 310, whereas for a Write operation the MAC enters a get data line operation 314.

In the read-data-and-metadata operation 310, the MAC reads the data line and the corresponding metadata from the sector. Then, at a return-data operation 312, the MAC returns, according to the type of metadata, one of (i) the read data line and the metadata; (ii) the read data line, corrected according to the metadata; or, (iii) the read data line and an error indication (if any). After operation 312, the flowchart ends.

In get data line operation 314, the MAC receives the data line from the processor and then, in an obtain-metadata operation 316, the MAC obtains the metadata that corresponds to the data line. In some embodiments, the MAC may comprise a metadata generation circuit (e.g., parity generation circuit 208, FIG. 2) and in other embodiments the MAC obtains the metadata from the processor.

After operation 316, the MAC enters a store operation 318, and stores the data and the metadata at the calculated offsets in the selected NVM sector. After operation 318 the flowchart ends.

Efficient Address Mapping

In embodiments, address mapping comprises computing integer division of a byte address by the logical page size to find the sector number, and modulo division of the byte address by the logical page size to find an offset within the page to the actual byte of data.

In the example embodiments presented hereinabove, the logical page size is 224*16=512*7 bytes. We denote the logical byte address LA, and define:

a=LA/512
b=LA %512
c=a/7 (integer division)
d=a %7
It can be shown:
sector=c
offset=d*512+b
metadata offset=224*16+offset/16

Figure 4:
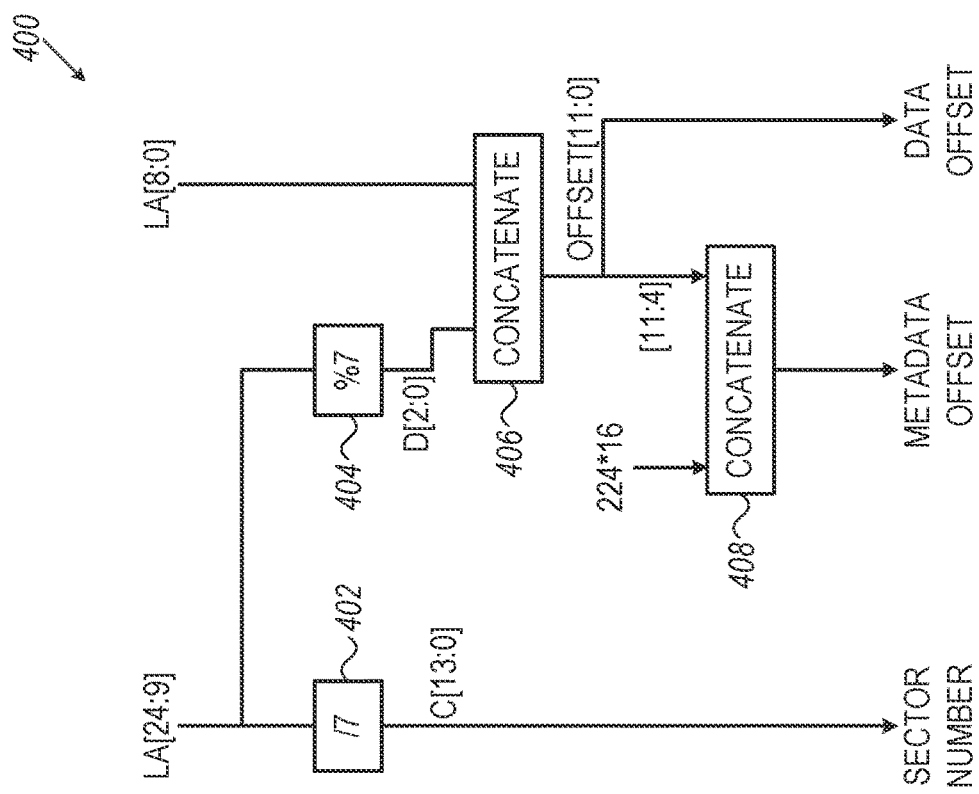
FIG. 4 is a block diagram that schematically illustrates an address mapping circuit, in accordance with an embodiment of the present invention.

FIG. 4 is a block diagram that schematically illustrates an address mapping circuit 400, in accordance with an embodiment of the present invention. The configuration of address mapping circuit 400 is a straightforward implementation of the address mapping procedure described above. We assume that the input logical address—LA, comprises 25 bits. A divide-by-7 circuit 402 integer-divides LA[24:9] (the most significant 16 bits) by 7, generating the 14-bit sector-number C, and a modulo-7 circuit 404 modulo-divides LA[24:9] by 7, generating 3-bit D.

A first concatenate circuit 406 concatenates D with LA[8:0] (the 9 least-significant bits of LA) to generate the 12-bit offset of the data-line within the sector and, lastly, a second concatenate circuit 408 concatenates 224*16 with the eight most-significant bits of the offset (OFFSET [11:4]) to generate the offset of the corresponding metadata within the sector.

It should be noted that, in embodiments, concatenate circuits 406 and 408 are merely assemblies of wires, and do not comprise any gates or other hardware circuits.

Figure 5:
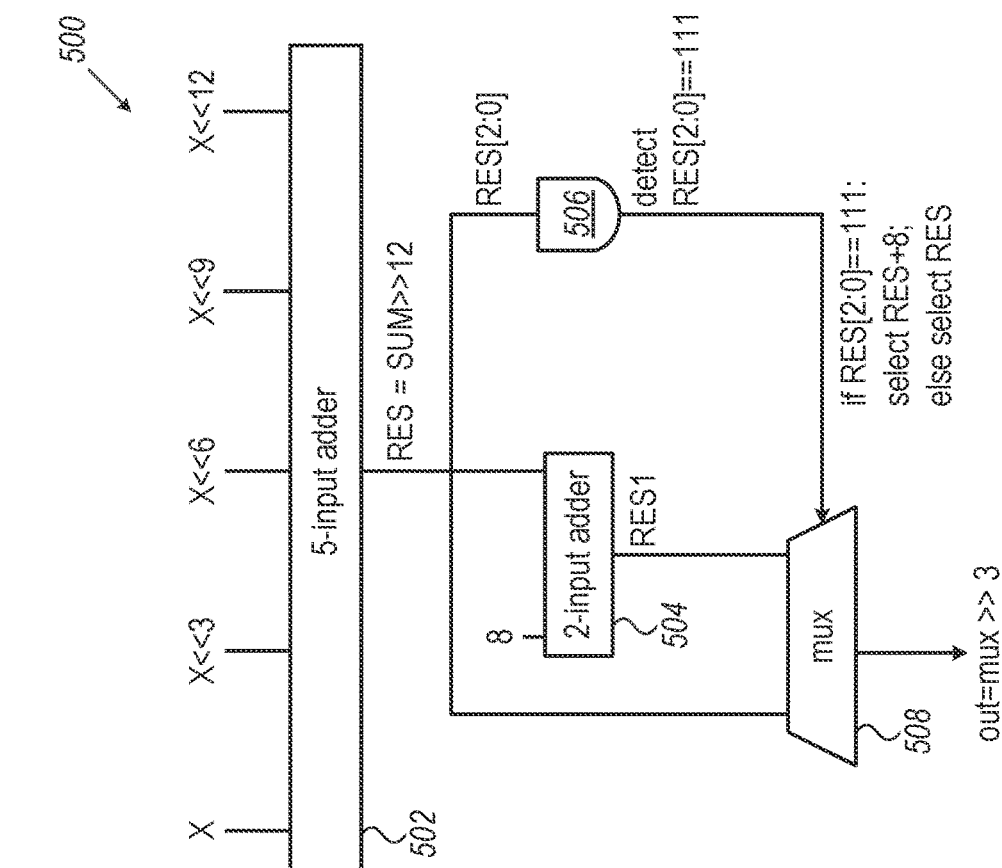
FIG. 5 is a block diagram that schematically illustrates the configuration of a divide-by-7 circuit, in accordance with an embodiment of the present invention.

FIG. 5 is a block diagram that schematically illustrates the configuration of a divide-by-7 circuit 500, in accordance with an embodiment of the present invention. The input of the divide-by-7 circuit is denoted X, wherein X is a 15-bit binary number.

The configuration of divide-by-7 circuit 500 is a straightforward implementation of the divide-by-7 procedure described above, for 15-bit inputs. The divide-by-7 circuit comprises a five-input adder 502 that generates RES, a two-input adder 504 that generates RES1, an AND gate 506 that detects RES&7==7, and a multiplexer 508 that selects either RES or RES1, according to the output of gate 506.

Figure 6:
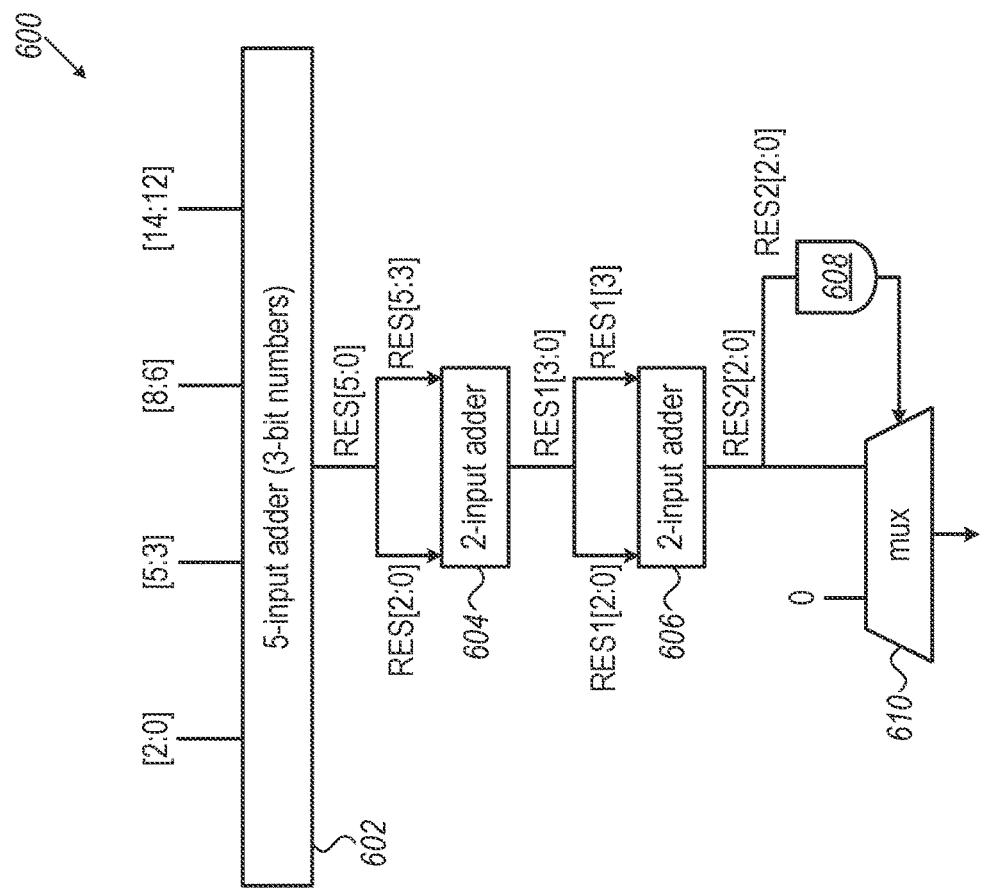
FIG. 6 is a block diagram that schematically illustrates the configuration of a modulo-7 circuit, in accordance with an embodiment of the present invention.

FIG. 6 is a block diagram that schematically illustrates the configuration of a modulo-7 circuit 600, in accordance with an embodiment of the present invention. The input of the modulo-7 circuit is denoted X, wherein X is a 15-bit binary number. The modulo-7 circuit comprises a five-input adder 602 that generated RES, a two-input adder 504 that generated RES1, a two-input adder 606 that generates RES2, an AND gate 608 that detects RES2&7==7, and a multiplexer 610 that selects either RES2 or 0, according to the output of AND gate 608. The modulo-7 output is the output of multiplexer 610 (note that all adders add 3-bit numbers).

Figure 7:
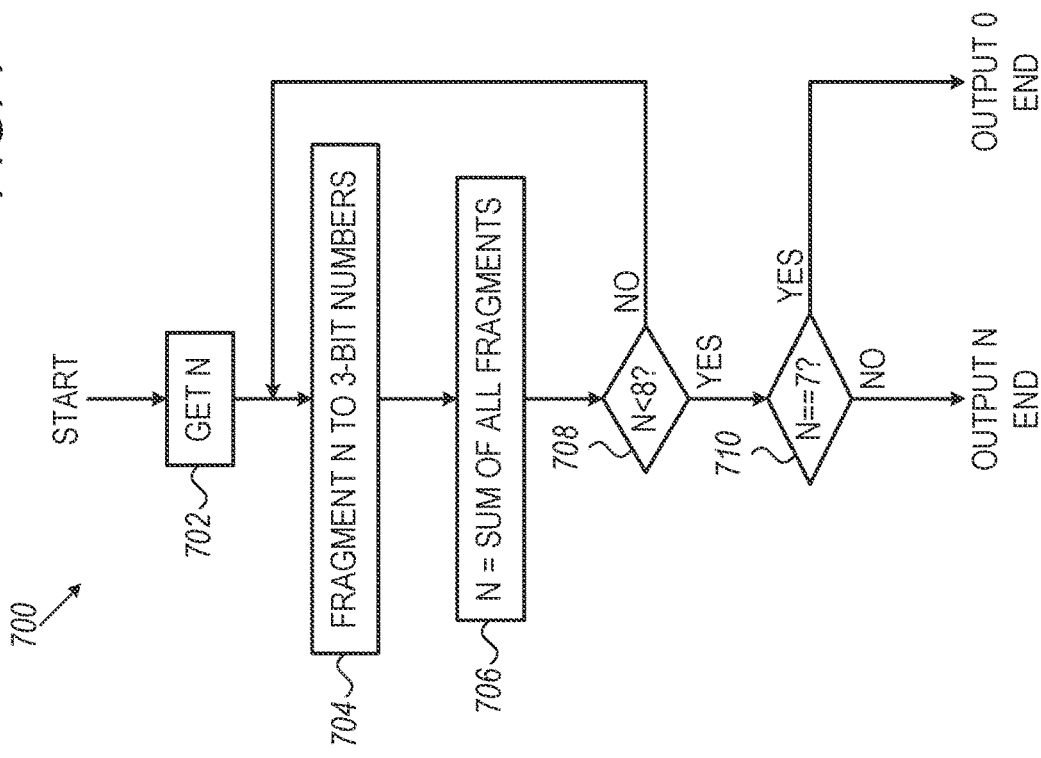
FIG. 7 is a flowchart that schematically illustrates a method to efficiently calculate modulo 7 of a given number, in accordance with an embodiment of the present invention.

FIG. 7 is a flowchart 700 that schematically illustrates a method to efficiently calculate modulo 7 of a given, in accordance with an embodiment of the present invention. The flowchart is executed by MAC 212 (FIG. 2). The flowchart starts at a get-N operation 702, wherein the MAC receives the number N from the processor. Next, in a Fragment operation 704, the MAC divides N to 3-bit fragments. Then in a sum-fragments operation 706, the MAC accumulates all fragments to get a new N, with less bits. Next, in a check-N-size operation 708, the MAC checks if the value of N is smaller than 8. If so, the MAC enters a check-7 operation 710, wherein the MAC corrects N if N equals 7 (sets N to 0), and the flowchart ends.

If, in operation 708, N is equal to or greater than 8 (that is—N comprises more than 3 bits), the MAC reenters operation 704, to further decrease the size of N.

As explained above, the selection of m=3 in the example embodiments illustrated in FIGS. 6, 7 and described hereinabove is purely by way of example. In other embodiments, circuits 500 and 600 can be modified for any suitable integer value of m.

The configurations of address mapping circuit 400, including divide-by-7 circuit 500, modulo-7 circuit 600, the storing and retrieving data method 300 and the modulo-7 method 700, illustrated in FIGS. 3 through 7 and described hereinabove are cited by way of example. Other configurations and methods may be used in alternative embodiments. For example, in some embodiments, X comprises more than 17 bits, and, consequently, the adders of FIGS. 5 and 6 comprise more inputs. In an embodiment, a single metadata byte is added to each 16-byte data line (allowing single-bit error detection only); 240 data lines and 240 metadata bytes are stored in a sector (leaving only 16 unused bytes). Since 240=15*16, a divide-by-15 and a modulo-15 circuits are implemented, and the circuits and methods are modified accordingly (the divide-by-7 and modulo-7 circuits described with reference to FIGS. 5, 6 can be extended to cover any divisor that is equal to $2^m-1$, e.g., 7, 15, 31, etc.)

The configurations of computer system 200, memory device 204, including the configuration of MAC 212, divide-by-7 circuit 500, modulo-7 circuit 600, address mapping 100, the methods of flowcharts 300 and 700, illustrated in FIGS. 1 through 7 and described hereinabove, are example configurations and flowcharts that are shown purely for the sake of conceptual clarity. Any other suitable configurations and flowcharts can be used in alternative embodiments.

The different sub-units of computing system 200, including memory device 204 and subunits thereof, may be implemented using suitable hardware, such as in one or more Application-Specific Integrated Circuits (ASICs) or Field-Programmable Gate Arrays (FPGAs), using software, using hardware, or using a combination of hardware and software elements.

processor 202 may comprise one or more general-purpose processors, which are programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A memory device, comprising:
a Non-Volatile Memory (NVM), comprising a plurality of sectors; and
a memory access circuit, configured to:
receive, from a host, a logical address of a block of data;
compute a mapping of the logical address to a data physical address comprising a selected sector among the plurality of sectors and a selected data offset within the same selected sector;
compute a metadata physical address that comprises the selected sector and a metadata offset in the selected sector; and
access the block of data at the data physical address, and the metadata at the metadata physical address,
wherein a size of each sector, in bytes, is an integer power of two, and wherein a number of blocks of data in each sector is of the form $(2^m-1)\cdot 2^n$, m and n denoting integer values.

2. The memory device according to claim 1, wherein the memory access circuit is configured to receive a write command and the block of data from the host, and, responsively, obtain the metadata that corresponds to the block of data, store the block of data in the NVM at the data physical address, and store the metadata in the NVM at the metadata physical address.

3. The memory device according to claim 1, wherein the memory access circuit is configured to receive a read command from the processor and, responsively, read the block of data that is stored in the NVM at the data physical address, and read the metadata that is stored in the NVM at the metadata physical address.

4. The memory device according to claim 1,
wherein the memory access circuit comprises a divide-by-$(2^m-1)$ circuit, which is designed to compute an integer division of a given input by $(2^m-1)$; and
wherein the memory access circuit is configured to compute the mapping of the logical address to the data physical address by applying the divide-by-$(2^m-1)$ circuit to the logical address.

5. The memory device according to claim 4, wherein the divide-by-$(2^m-1)$ circuit is configured to compute the integer division of the given input by $(2^m-1)$ by:
calculating a shift-and-add sum of (i) the given input and (ii) the given input shifted left by integer multiples of m bits;
repeating calculation of the shift-and-add sum a number of times d, depending on a required precision;
cutting off (d−1)·m least significant bits of the sum to obtain a result, and adding $2^m$ to the result if the result is equal to $2^m-1$; and
cutting off the m least significant bits.

6. The memory device according to claim 1,
wherein the memory access circuit comprises a modulo-$(2^m-1)$ circuit, which is designed to compute a modulo-$(2^m-1)$ of a given input; and
wherein the memory access circuit is configured to compute the data offset and the metadata offset by applying the modulo-$(2^m-1)$ circuit to the logical address.

7. The memory device according to claim 6, wherein the modulo-$(2^m-1)$ circuit is configured to receive an input number and, recursively: (i) divide the input number into a group of m-bit fragments, (ii) add the m-bit fragments to one another to obtain an output number smaller than the input number; and (iii) repeat steps (i) and (ii) until the output number is less than $2^m$.

8. The memory device according to claim 4, wherein m=3.

9. A method for accessing a Non-Volatile Memory (NVM) that includes a plurality of sectors, the method comprising:
receiving, from a host, a logical address of a block of data;
computing a mapping of the logical address to a data physical address comprising a selected sector among the plurality of sectors and a selected data offset within the same selected sector;
computing a metadata physical address that comprises the selected sector and a metadata offset in the selected sector; and
accessing the block of data at the data physical address, and the metadata at the metadata physical address,
wherein a size of each sector, in bytes, is an integer power of two, and wherein a number of blocks of data in each sector is of the form $(2^m-1)\cdot 2^n$, m and n denoting integer values.

10. The method according to claim 9, wherein accessing the block of data and the metadata comprise receiving a write command and the block of data from the host, and, responsively, obtaining the metadata that corresponds to the block of data, storing the block of data in the NVM at the data physical address, and storing the metadata in the NVM at the metadata physical address.

11. The method according to claim 9, wherein accessing the block of data and the metadata comprise receiving a read command from the processor and, responsively, reading the block of data that is stored in the NVM at the data physical address, and reading the metadata that is stored in the NVM at the metadata physical address.

12. The method according to claim 9, wherein computing the mapping of the logical address to the data physical address comprises applying to the logical address a divide-by-$(2^m-1)$ circuit, which is designed to compute an integer division of a given input by $(2^m-1)$.

13. The method according to claim 12, and comprising computing the integer division of the given input by $(2^m-1)$ by:
calculating a shift-and-add sum of (i) the given input and (ii) the given input shifted left by integer multiples of m bits;
repeating calculation of the shift-and-add sum a number of times d, depending on a required precision;
cutting off $(d-1)\cdot m$ least significant bits of the sum to obtain a result, and adding $2^m$ to the result if the result is equal to $2^m-1$; and
cutting off the m least significant bits.

14. The method according to claim 9, wherein computing the data offset and the metadata offset comprises applying to the logical address a modulo-$(2^m-1)$ circuit, which is designed to compute a modulo-$(2^m-1)$ of a given input.

15. The method according to claim 14, and comprising computing the a modulo-$(2^m-1)$ by receiving an input number and, recursively: (i) dividing the input number into a group of m-bit fragments, (ii) adding the m-bit fragments to one another to obtain an output number smaller than the input number; and (iii) repeating steps (i) and (ii) until the output number is less than $2^m$.

16. The method according to claim 9, wherein m=3.

* * * * *